(12) United States Patent
Bajpay et al.

(10) Patent No.: US 7,818,283 B1
(45) Date of Patent: Oct. 19, 2010

(54) SERVICE ASSURANCE AUTOMATION ACCESS DIAGNOSTICS

(75) Inventors: Paritosh Bajpay, Edison, NJ (US); Roberta A. Bienfait, Norcross, GA (US); Mojgan Dardashti, Holmdel, NJ (US); Hossein Eslambolchi, Los Altos Hills, CA (US); Jackson Liu, Middletown, NJ (US); John McCanuel, Bailey, CO (US); Zhiqiang Qian, Holmdel, NJ (US); Michael J. Zinnikas, North Brunswick, NJ (US)

(73) Assignee: AT&T Corp., New York, NY (US)

( * ) Notice: Subject to any disclaimer, the term of this patent is extended or adjusted under 35 U.S.C. 154(b) by 1335 days.

(21) Appl. No.: 11/316,145

(22) Filed: Dec. 22, 2005

(51) Int. Cl.
  *G06F 17/30* (2006.01)
(52) U.S. Cl. .................. 707/10; 707/204; 707/E17.005
(58) Field of Classification Search .................. 707/10, 707/204, E17.005; 704/42; 709/217
  See application file for complete search history.

(56) References Cited

U.S. PATENT DOCUMENTS 6,425,000 B1 * 7/2002 Carmello et al. ............ 709/217
2003/0177417 A1 * 9/2003 Malhotra et al. .............. 714/42
2007/0050678 A1 * 3/2007 Estes et al. ..................... 714/38

* cited by examiner

*Primary Examiner*—Ahmad F Matar
*Assistant Examiner*—Karen L Le

(57) ABSTRACT

A business process automation system architecture is used to isolate problems in a virtual private network access network. Codified rules and a rules based program are used to determine all equipment from a customer premises equipment to a VPN core access point equipment on a VPN access path and that is associated with a failure. The codified rules also govern the gathering of information on the equipment including determining whether the equipment supports automated diagnostics and the communication protocols used. Extended PING testing is done on the equipment and a status of the extended PING test, link status, line protocol status, and existing loop status is determined. Further testing is automatically run based on the codified rules and the status. The failure is then isolated to the CPE, a local exchange carrier, or a network provider.

20 Claims, 11 Drawing Sheets

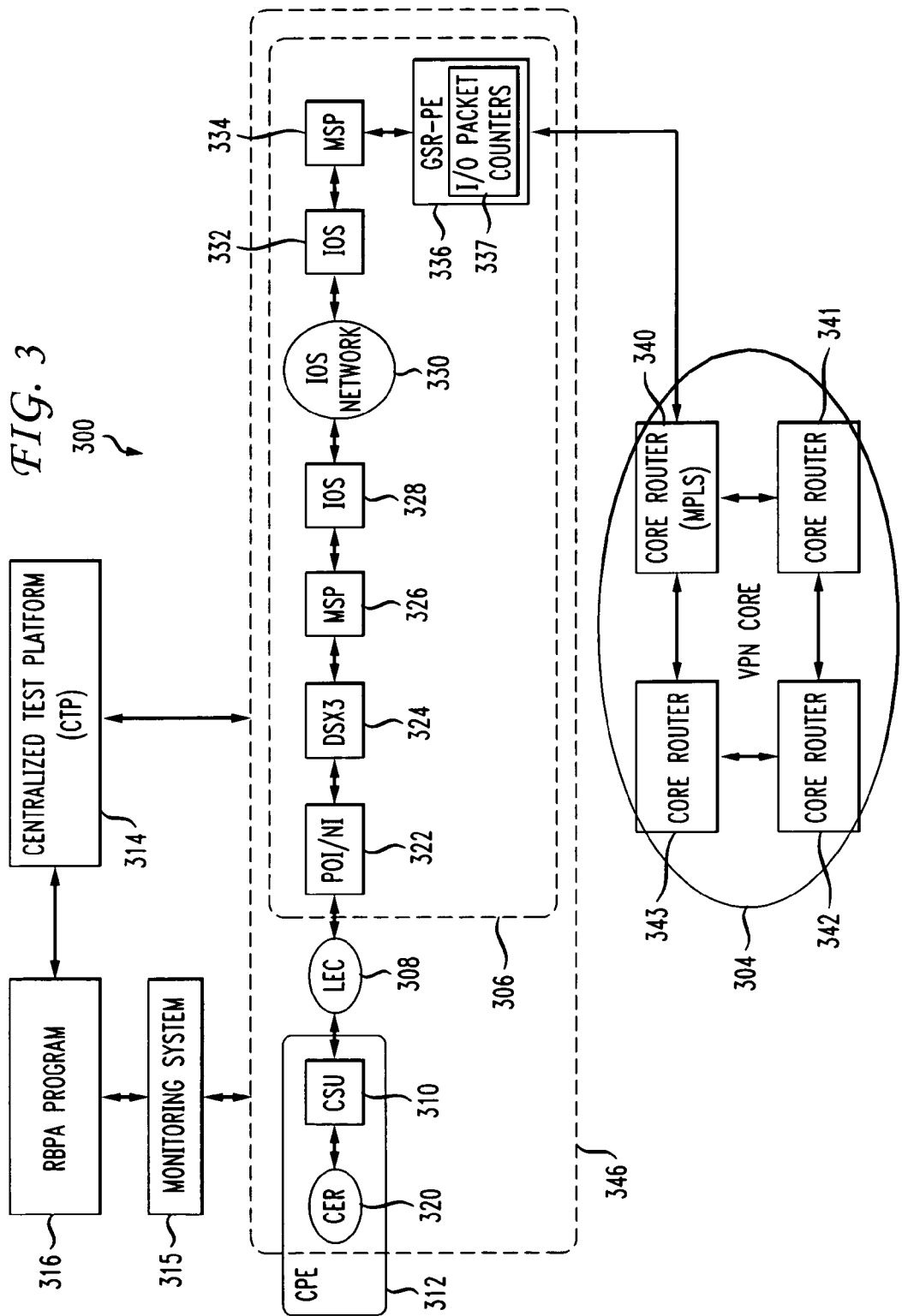

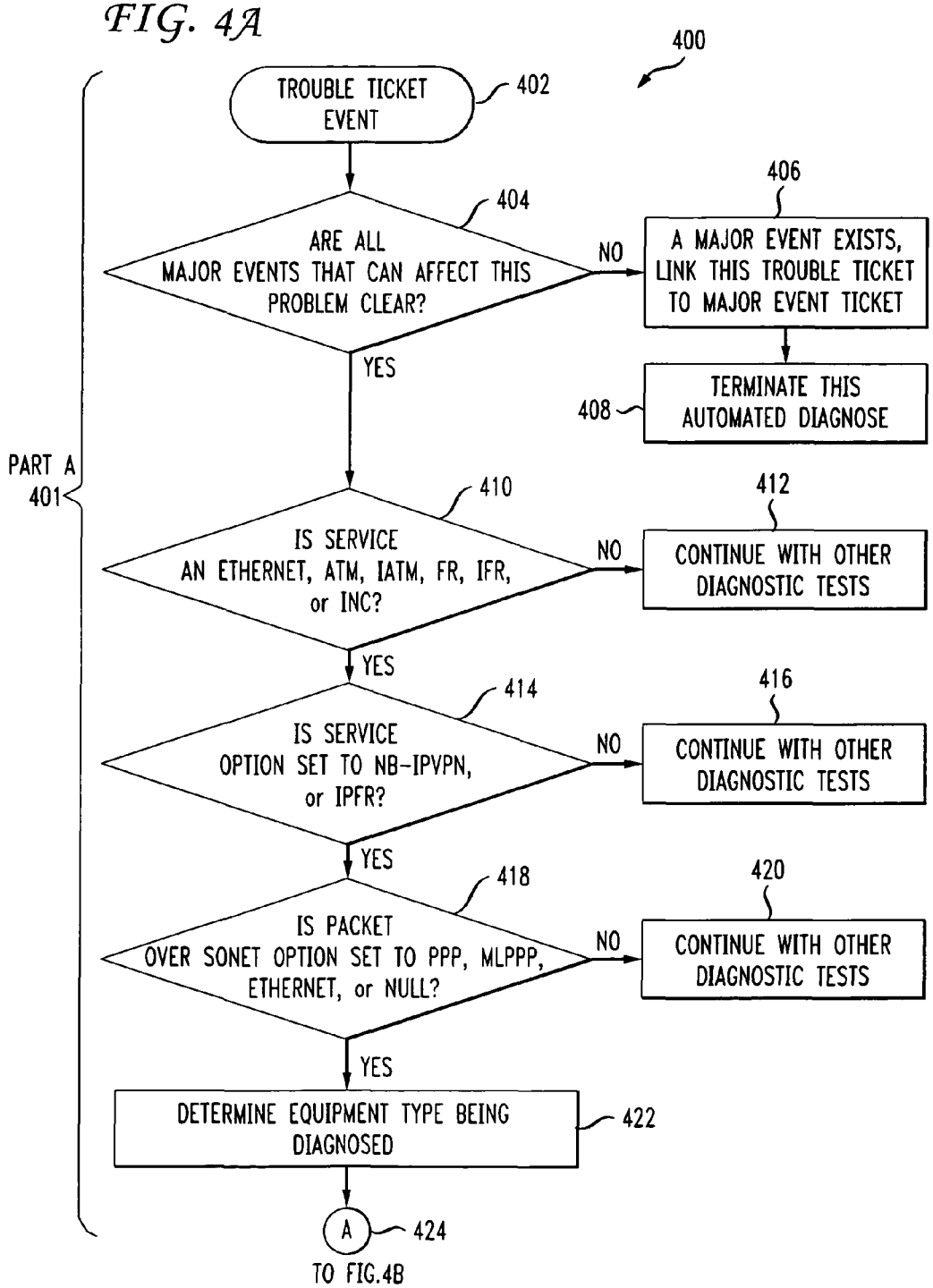

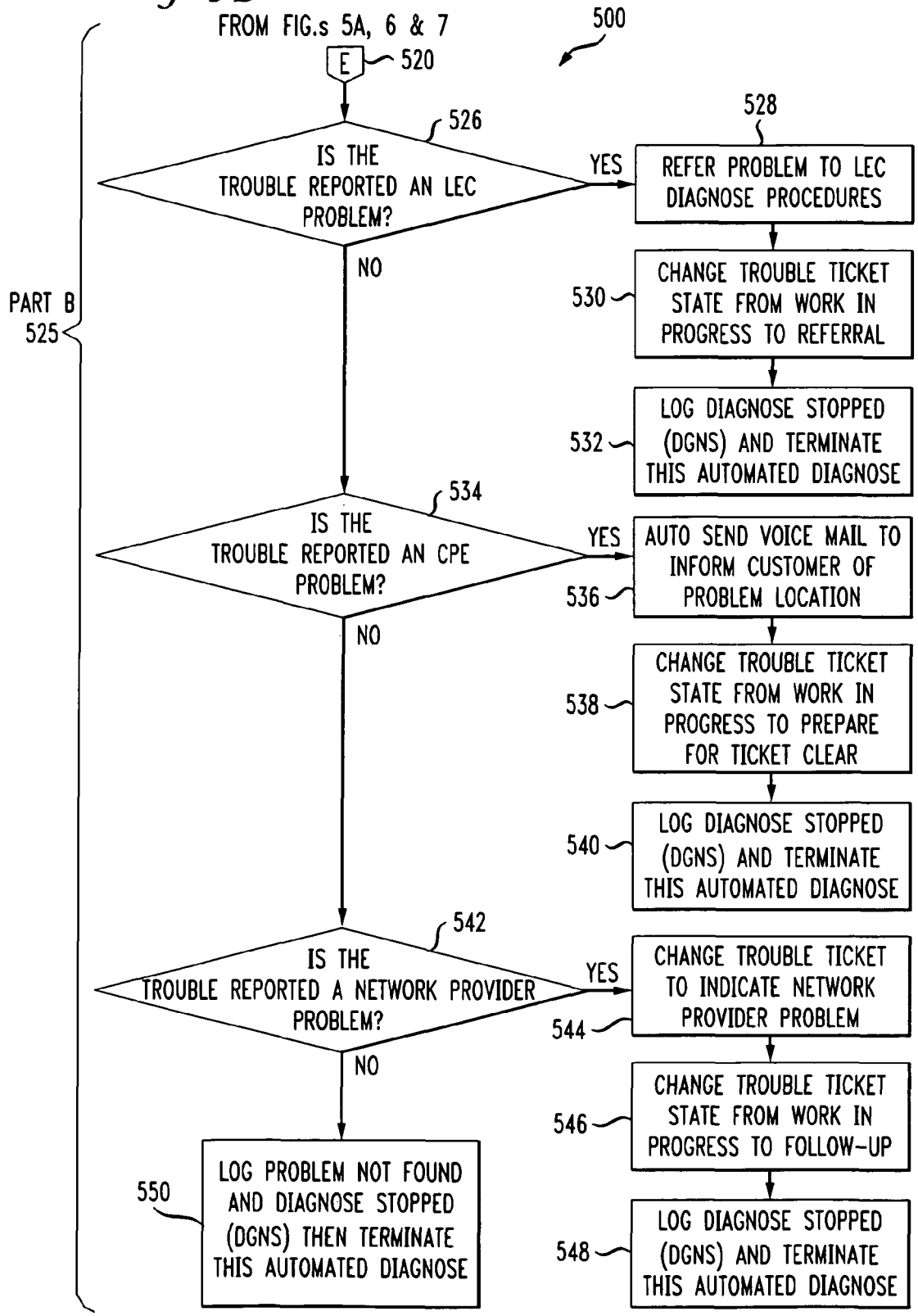

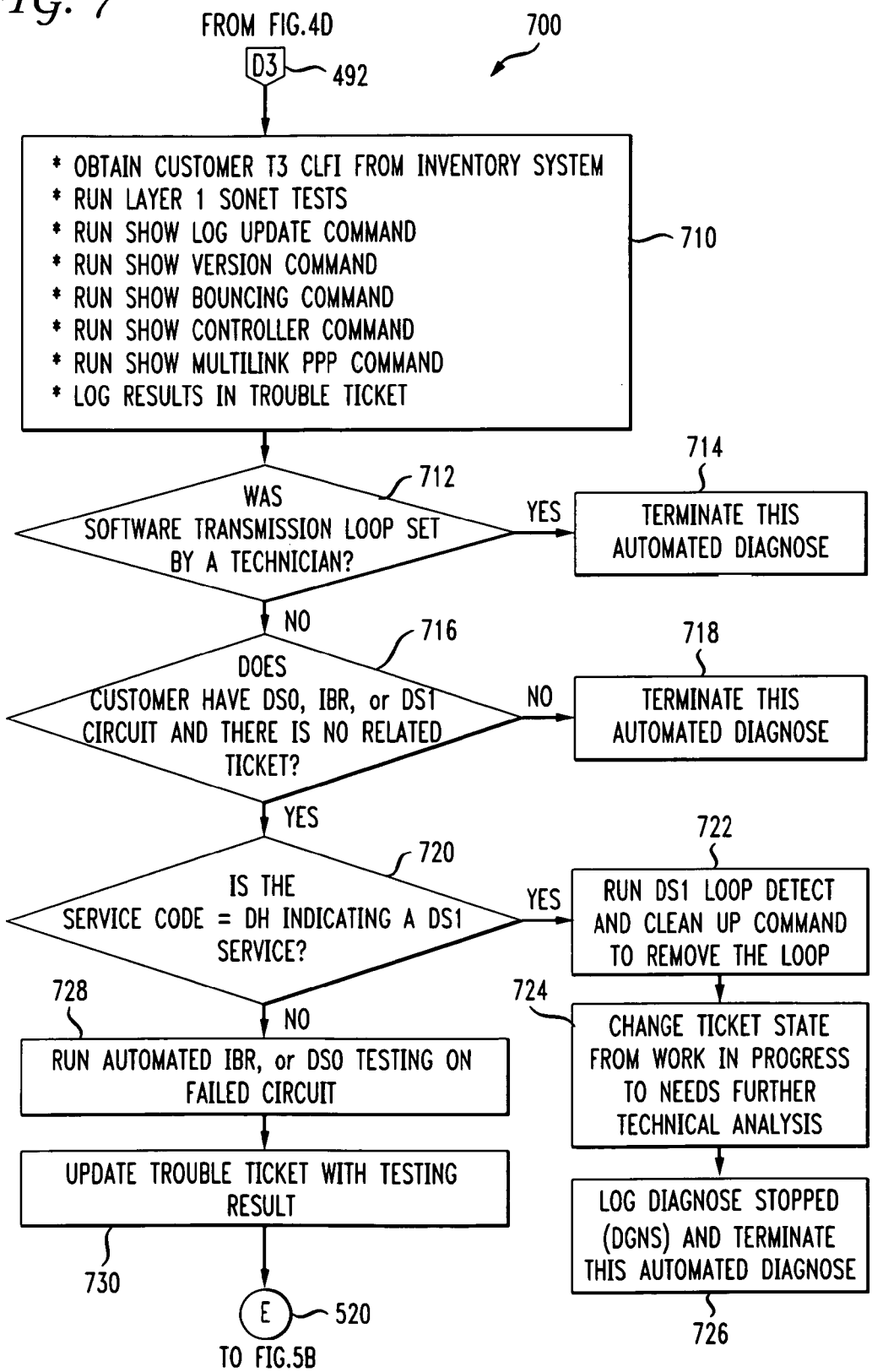

SERVICE ASSURANCE AUTOMATION ACCESS DIAGNOSTICS

CROSS REFERENCE TO RELATED APPLICATIONS

Patent applications entitled "Rules Based End-to-End Testing Diagnostics" U.S. application Ser. No. 11/315,437 and "Automated Rules Based Proactive Alarm Analysis and Response" U.S. application Ser. No. 11/316,144 both filed on Dec. 22, 2005, having the same inventors and assigned to the same assignee as the present invention are hereby incorporated by reference in their entirety.

FIELD OF INVENTION

This invention relates generally to automated diagnostic systems and procedures and, in particular, to rules-based, codified, procedures to diagnose network access problems, for example, on OCxx/gigabit Ethernet network switch routers used by providers of network-based virtual private network services.

BACKGROUND OF INVENTION

An organization, such as a company or a group of companies, may use a virtual private network (VPN) for secure communications over a public network. Failures that affect the reliability of the VPN access circuit may occur anywhere from a user's premises through the connection path to the VPN-provider network, and may be difficult to diagnose.

For example, access problems may reside at various levels in the seven layer open systems interconnection (OSI) model of computer network communication and failures of electronic components, including passive components such as cables, may surface in different communication layers. Physical layer 1 problems can occur at the cabling and signaling interface level where connections are established between network devices. Logical data link layer 2 issues may cause data errors associated with the protocols used on the access circuit. Network layer 3 problems may cause routing errors. Cross-layer interactions can complicate the identification of or otherwise mask the root cause of a component failure.

Users can access a VPN network using private lines provided by a VPN-provider, a local exchange carrier, or another alternate access provider. These private lines can be, for example, a 64 kbps circuit conforming to the digital signal 0 (DS-0) telecommunications standard, a line using NxDS-0, a 1.544 Mbps circuit using the digital signal 1 (DS-1) format, a line using NxDS-1, or the like. In many user access circuits, the lines are multiplexed into higher order facilities once they enter an access provider's network and subsequently enter the VPN provider's network. This access path, along with the access paths of many other customers, typically terminates on an optical communication hierarchy level X (OC-X) port on a gigabit switch router serving as an access point to the VPN-provider network. Consequently, when a user reports a problem in connecting to a VPN, the location of the failure causing the problem is typically not easy to determine. For example, a failure may be occurring with customer premises equipment (CPE), or with a local exchange carrier (LEC), or with the VPN provider. Due to the complexity of a customer network system, variability of equipment used, and use of different access alternatives, it may be quite time-consuming for a VPN provider to pinpoint the cause of a problem.

SUMMARY OF INVENTION

Isolating errors to the various electrical components in the path from a user to a VPN is primarily a manual time consuming process. The manual steps may cause network disruption, down time, and is a labor intensive process.

Among its many aspects, the present invention addresses apparatus and methods based on codified rules for automatically isolating failures in a virtual private network (VPN) access path. To such ends, a method in accordance with one aspect of the invention begins by receiving an indication of a failure. Then, a determination, based on the codified rules, is made of all equipment associated with the failure including equipment from a customer premises equipment (CPE) to VPN core access point equipment that is used on the VPN access path. Information is gathered on the determined equipment including support of automated diagnostic procedures and what type of communication protocols are used. A loop-back test is run on a selected segment of the VPN access path and a status including results of the loop-back test, a link status, a line protocol status, and an existing loop status are determined. Additional selected tests based on the codified rules and the status and run. The failure is then isolated to the CPE, a local exchange carrier, or a network provider.

Another aspect of the invention addresses a computer system for isolating failures in a virtual private network (VPN) access path using an automatic diagnostic program. The computer system comprises means for receiving an indication of a failure. To use the automatic diagnostic program, the computer system has a memory containing codified rules and a rules based program for running automatic diagnostic procedures associated with the failure. Also included in the computer system, are means for determining, based on the codified rules, all equipment associated with the failure including customer premises equipment (CPE) to a VPN core access point equipment that is on the VPN access path. Means are also provided for gathering information related to the determined equipment, including support of automated diagnostic procedures and communication protocols used, running an extended PING test on a selected segment of the VPN access path, and determining status including results of the extended PING test, link status, line protocol status, and existing loop status. Means are then utilized for automatically running by the rules based program additional selected tests based on the codified rules and the status Means are then utilized to isolate the failure to a local exchange carrier, the CPE, or a network provider. A more complete understanding of the present invention, as well as other features and advantages of the invention, will be apparent from the following detailed description and the accompanying drawings.

BRIEF DESCRIPTION OF DRAWINGS

FIG. 3 illustrates an example of a typical VPN-access architecture and diagnostic system in accordance with the present invention;

FIG. 4A illustrates a method part A for rules based automated VPN access testing diagnostics in accordance with the present invention;

FIG. 5B illustrates a method part B of rules based automated VPN access testing diagnostics for an optical carrier xx data rate (OCxx) card in accordance with the present invention;

FIG. 7 illustrates a method of rules based automated VPN access testing diagnostics for an optical carrier xx data rate (OCxx) card in accordance with the present invention.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
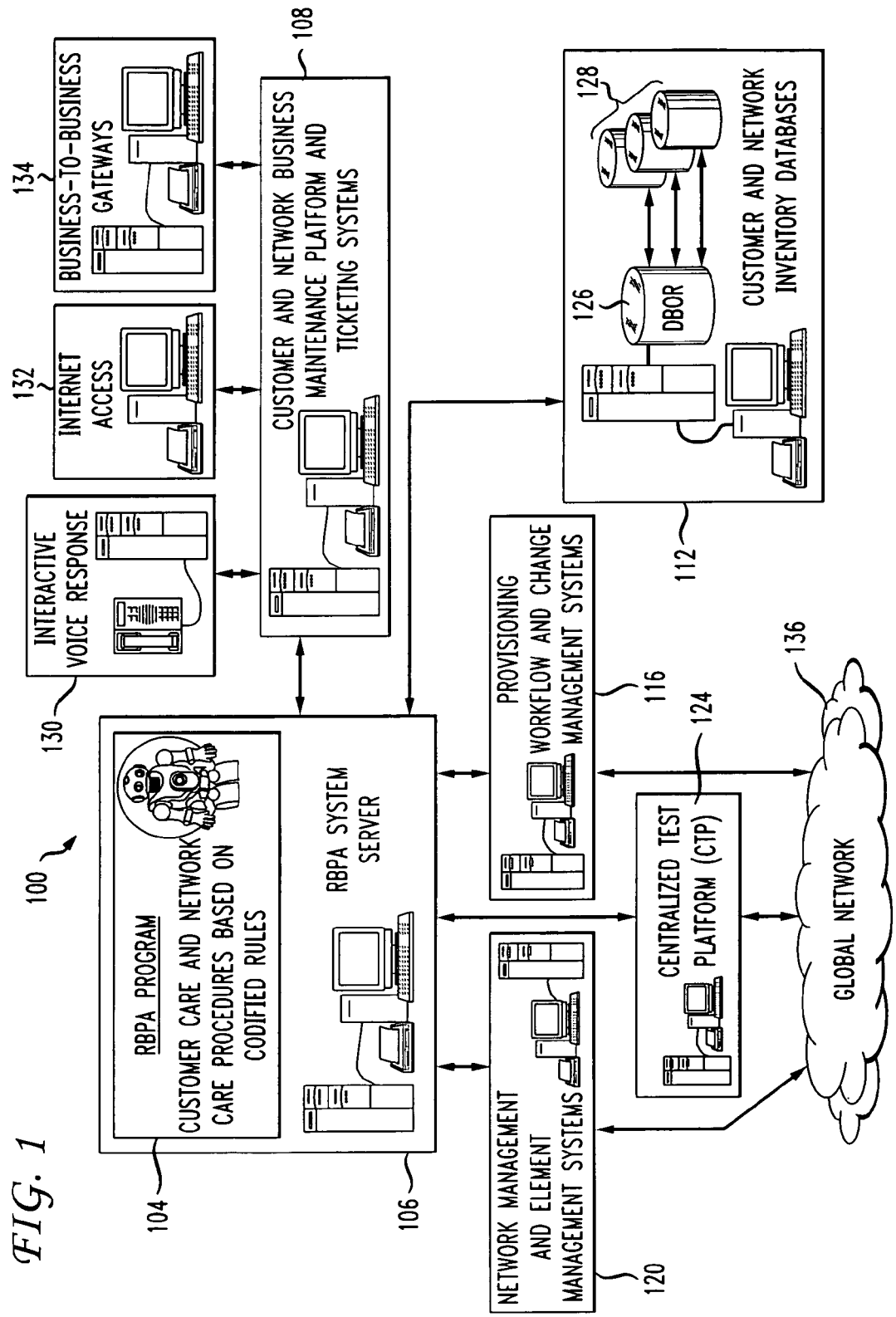
FIG. 1 illustrates an end-to-end business process automation systems architecture in accordance with the present invention.

FIG. 1 illustrates an end-to-end business process automation systems architecture 100. The end-to-end business process automation systems architecture 100 runs on an organization of servers and electronic equipment. A server, for example, is a processing system having one or more processors, memory, input/output units of high capacity and performance, such as, large capacity disk drives and high speed communication devices, and may have a keyboard, a display, and a printer. Server programs, as computer readable media, may be loaded from a disk drive or downloaded through a communication device, for example. Multiple servers are shown as used in the end-to-end business process automation systems architecture 100 and each server may be further configured as a cluster of servers to satisfy performance, capacity, and reliability requirements.

The end-to-end business process automation systems architecture 100 uses a rules based process automation (RBPA) program 104 that is operative on an RBPA system server 106. The RBPA program 104 is built upon procedures that are based on codified rules. The RBPA program 104 interfaces with customer and network business maintenance and ticketing systems 108, customer and network inventory databases 112, provisioning workflow and change management systems 116, network management and element management systems 120, and a centralized test platform (CTP) 124. The customer and network business maintenance platform and ticketing systems 108 use servers and programs to interface with an interactive voice response system 130, an Internet access portal 132, and business-to-business gateways 134. The interactive voice response system 130 uses voice recognition programs and equipment to respond to voice requests, such as, verbal problem reports called in by a user and to send verbal messages and status to users. The Internet access portal 132 uses a computing device to access the Internet and once authorized, gain access to the customer and network business maintenance platform and ticketing systems 108 to create, view, and update trouble tickets concerning, for example, problem reports. The business-to-business gateways 134 use gateway servers and computing devices to provide an access path from a private business network to a global network 136 and interface with the customer and network business maintenance platform and ticketing systems 108 to report, for example, problems with a gateway interface.

The customer and network inventory databases 112 are operative on a server running a database of record (DBOR) program 126 which facilitates the accessing of information from a plurality of databases 128. The databases 128 contain, for example, specific customer and network inventory information and support for automatic diagnostic procedures such as loop-back test procedures useful in the analysis of problems that might occur in the customer and network systems.

The provisioning workflow and change management systems 116 are operative on servers using programs that affect the global network 136. The network management and element management systems 120 are also operative on servers using programs that affect the global network 136. For example, problems, such as customer specific alarms, may be automatically reported to one of the network management and element management systems 120 from a specific network element in the global network 136. The centralized test platform (CTP) 124 is operative on a server and electronic equipment to provide access paths to network elements in the global network 136 for the purposes of supporting automated test programs as directed by the RBPA program 104.

The global network 136 provides end-to-end connection services to users, a virtual private network (VPN), and interfaces with the provisioning workflow and change management systems 116, the network management and element management systems 120, and the CTP 124.

Figure 2:
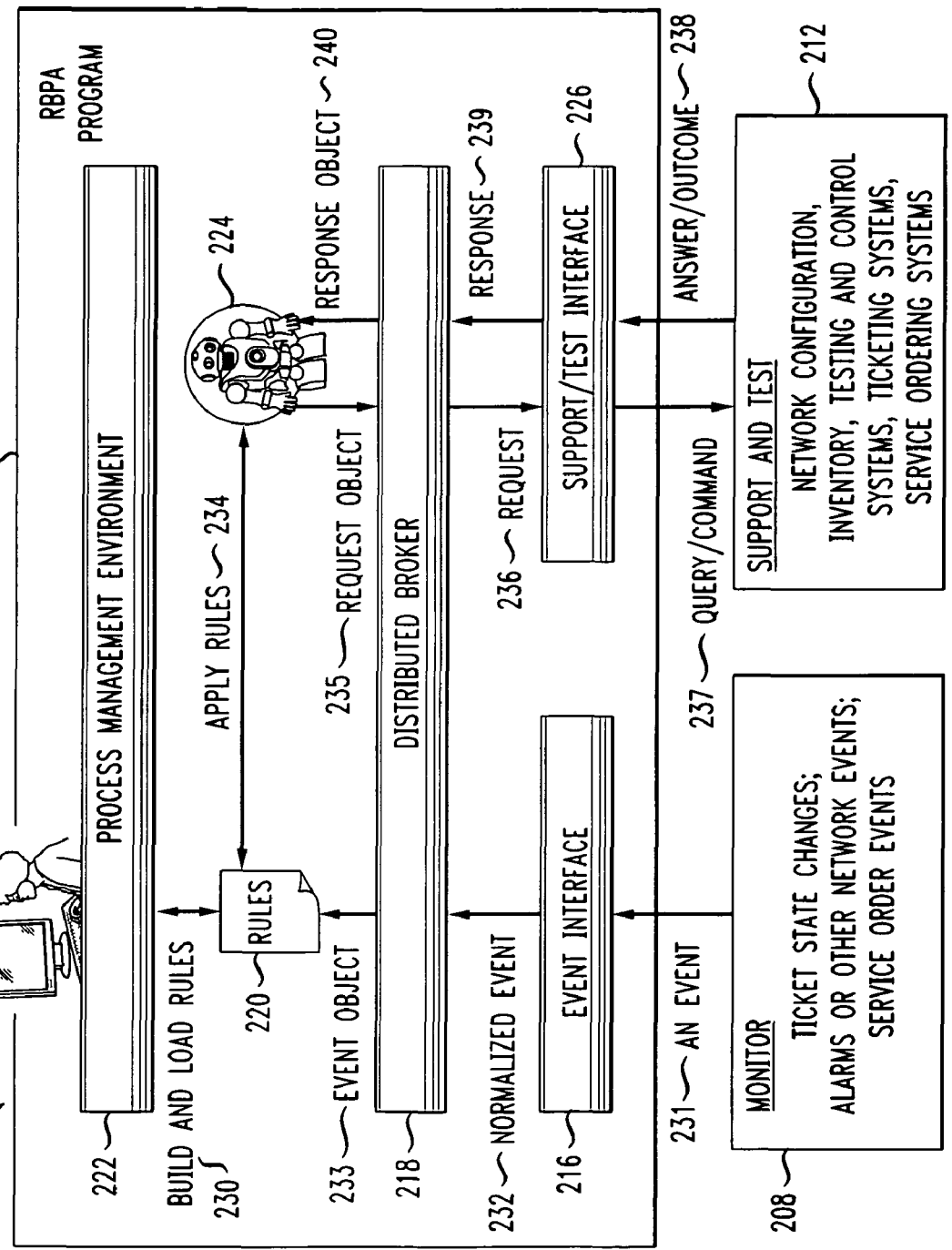
FIG. 2 illustrates a systems architecture illustrating the flow of automated diagnostic procedures in a rules based environment in accordance with the present invention.

FIG. 2 illustrates a systems architecture 200 illustrating the flow of automated diagnostic procedures in a rules based environment. The systems architecture 200 uses a rules based process automation (RBPA) program 204 to respond to events from monitoring systems 208. An event detected by the monitoring systems 208 may be a change in the state of a trouble ticket, an alarm due to a detected failure, or other network events, such as a threshold crossing event on dropped packets, a service order event, and the like. A response to an event may include querying for information and testing sections of a global network, such as global network 136, using support and test systems 212. The RBPA program 204 provides an event interface 216, a distributed broker 218, codified rules 220, a process management environment 222, rule agents 224, and a support/test interface 226. The support and test systems 212 include information on network configuration, inventory, and the like, testing and control systems, ticketing systems, service ordering systems, or the like.

A flow of automated diagnostic procedures is shown overlaid on the system architecture 200 to illustrate the flow of automated procedures used to diagnose problems that have been reported. In order to support automated diagnostic procedures, a set of codified rules 220 are built and loaded into the RBPA program 204 in a first step 230.

When the monitoring systems 208 detect an incident in their monitored systems, an event 231 is passed to the event interface 216 which generates a normalized event 232. A normalized event is a common report file that is used to support multiple different types of events reported by different means. For example, an event may be reported by a voice response system 130, an Internet message from an Internet access portal 132, a business-to-business gateway 134, an element management system alarm from network management and element management systems 120, or other means for reporting problems.

The normalized event 232 is distributed by the distributed broker 218 as an event object 233. Codified rules 220, associated with the event object 233, are selected and applied in the next step 234 by the rule agents 224. Based on the codified rules 220, a request object 235, requesting specific information, is made to the distributed broker 218. A request 236 is then forwarded to the support/test interface 226. The support/test interface passes a query/command 237 to the support and test systems 212. For example, a query may request information access from a database, such as one of the plurality of databases 128 accessed through the DBOR program 126. The query/command 237 may also be a command for automated testing of a specified component or group of components as supported by the CTP 124.

The answer/outcome response 238 of the query 237 is returned to the support/test interface 226 which forwards a response 239 to the distributed broker 218. The distributed broker 218 forwards a response object 240 to the rule agents 224 that authorized the original request object 235. The rule agents 224 then apply procedures codified in the rules to analyze attributes of the response object and may request further information be gathered, additional automated testing be done, manual testing be done, present status of diagnostic processing, or the like.

FIG. 3 illustrates an example of a typical VPN-access architecture and diagnostic system 300. The VPN-access architecture and diagnostic system 300 contains a VPN core 304, a VPN-provider access network 306, an access circuit from a local exchange carrier (LEC) 308, a customer premises equipment (CPE) 312, a centralized test platform (CTP) 314, monitoring system 315, and an RBPA program 316. When a user attempts access to the VPN core 304, messages are sent through a customer edge router (CER) 320 which connects to a channel service unit (CSU) 310. The message path then proceeds to the LEC 308, and enters the VPN-provider access network 306. The VPN-provider access network 306 is typically a complex path having many components, such as a point of interface/network interface (POI/NI) unit 322, a digital signal level 3 cross connect (DSX3) unit 324, a first multi-services platform (MSP) unit 326, a first intelligent optical switch (IOS) unit 328, an IOS-based network 330, a second IOS unit 332, a second MSP unit 334, and a gigabit switch router provider equipment (GSR-PE) unit 336. The VPN core 304 contains multiple core routers, such as core routers 340-343 that are connected to various VPN access paths, such as VPN access path 346.

When customers have problems with their VPN service, they report the trouble to the VPN provider using, for example, the systems depicted in FIG. 1, including interactive voice response (IVR) 130, Internet access portal 132, business to business gateways 134, or by directly calling a work center and talking to a technician. This action will result in a trouble ticket being created in the Ticketing Systems 108 which causes an event to be sent to the RBPA program 316. For example, a detected error is encoded in a trouble ticket providing a description of the information available to describe the error. Such information encoded on a trouble ticket may include error type, unit detecting the error, duration and frequency of the error, and the like. This information represents a change in state of a trouble ticket. The event is then processed by the flow of automated diagnostic procedures shown in the rules-based systems architecture 200. Automated diagnostic procedures may include specific tests of various devices in the VPN access path that are known by the codified rules, for example, to support loop-back testing.

Devices such as the channel service unit 310 and many digital cross connect systems are designed to respond to a specific code sequence of 1's and 0's in a transmission that causes the device to loop the transmission back to the sender. In the case of the CSU 310, a test message may be encoded for a loop-back test and initiated by CTP 314 acting upon a device in the VPN-provider access network 306 at the request of RBPA program 316. The CSU 310 receives the message, interprets the loop-back encoding, and sends the message back as requested by the message encoding. The sender device in the VPN-provider access network 306 then receives the test message and can evaluate the response. In this fashion, with devices that support loop-back testing, a test sequence can be setup to test to a point A in the access path, then to a point B, and so forth in order to isolate problems to a specific segment in the VPN access path 346. Prompt repair of the VPN service requires timely isolation of problems to the VPN-provider access network 306, the local exchange carrier (LEC) 308, or the customer premises equipment (CPE) 312.

FIG. 4A illustrates part A 401 of a method 400 for rules based automated VPN access testing diagnostics. A trouble ticket event 402 is generated to the RBPA program 316. In decision step 404, a determination is made whether all major events, such as a fiber cut, that can affect this problem are clear. If there is a major event that can affect this problem, the method proceeds to step 406 which links the trouble ticket, associated with the trouble ticket event 402, to a different ticket associated with the major event. In step 408, this automated diagnose procedure is terminated.

In decision step 404, if all major events that can affect this problem are clear, then the process proceeds to decision step 410. In decision step 410, the type of service is determined. If the service is not an Ethernet, asynchronous transfer mode (ATM), international asynchronous transfer mode (IATM), frame relay (FR), international frame relay (IFR), or integrated network connection (INC) service, then the process proceeds to step 412, which continues with other diagnostic tests for other types of services.

If the service is an Ethernet, ATM, IATM, FR, IFR, or INC service, then the process proceeds to decision step 414. In decision step 414, a determination is made as to whether a service option is set to Network-Based IP Virtual Private Network (NB-VPN), or Internet protocol enabled frame relay (IPFR). If the service option is not set to NB-IPVPN, or IPFR, the process proceeds to step 416. In step 416, the process continues with other diagnostic tests for other service options.

If the service option is set to NB-IPVPN, or IPFR, then the process proceeds to decision step 418. In decision step 418, it is determined whether a packet over synchronous optical network (SONET) option is set to point-to-point protocol (PPP), multi-link point-to-point protocol (MLPPP), Ethernet, or NULL (meaning no value assigned). If the packet over SONET option is not set to PPP, MLPPP, Ethernet, or NULL, then the process proceeds to step 420, which continues with other diagnostic tests for other service options. If the packet over SONET option is set to PPP, MLPPP, Ethernet, or NULL, then the process proceeds to step 422. In step 422, the type of equipment that may be involved in the reported event is determined as may be gathered from the customer and network inventory databases 112 of FIG. 1, for example.

Associated with the selected equipment are suites of tests that can be performed. The process then proceeds to connecting point A 424.

Figure 4B:
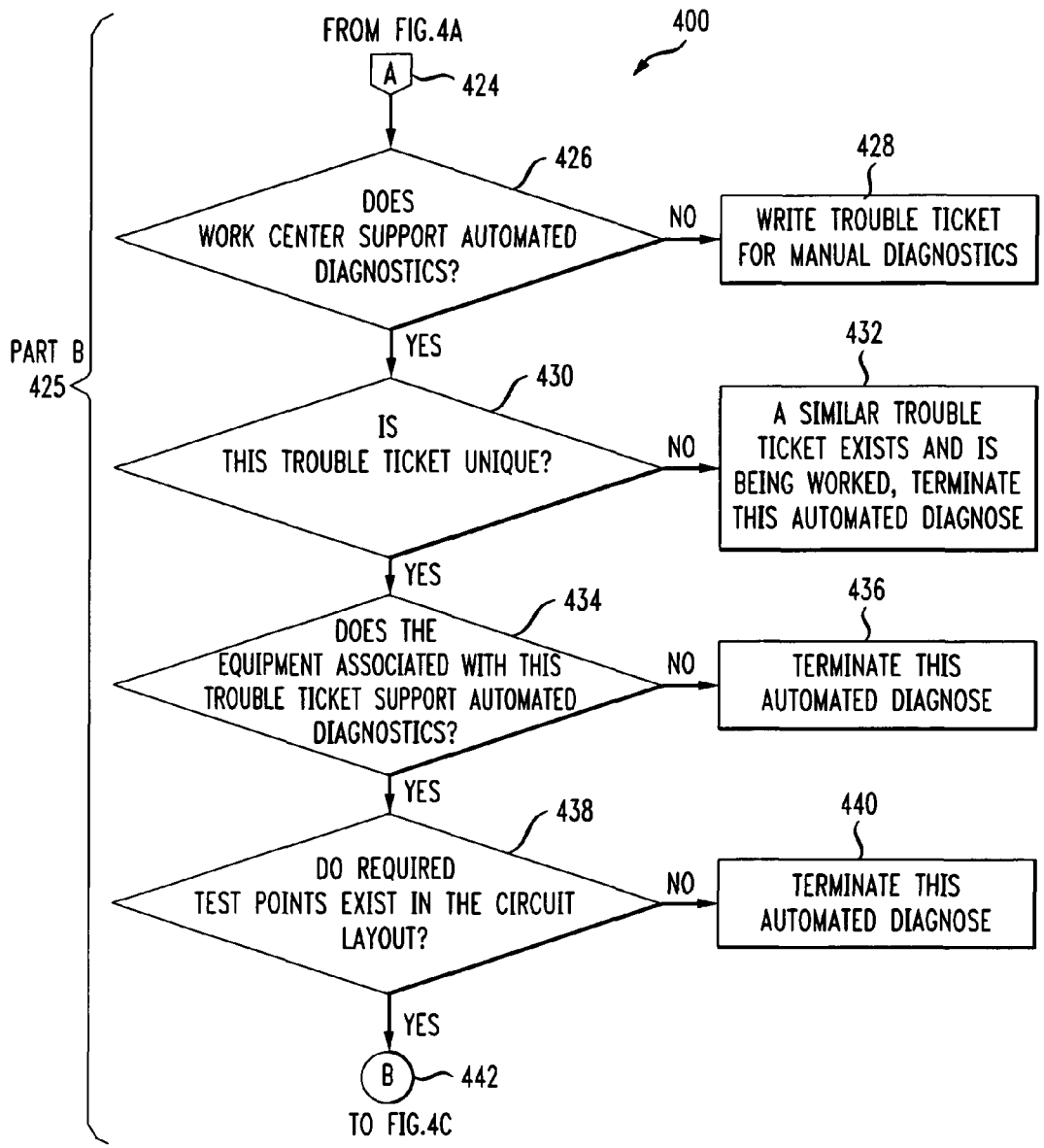
FIG. 4B illustrates a method part B for rules based automated VPN access testing diagnostics in accordance with the present invention.

FIG. 4B illustrates part B 425 of the method 400 for rules based automated VPN access testing diagnostics. Point A 424 connects to decision step 426. In decision step 426, a determination is made on whether a work center associated with the selected equipment supports automated diagnostics. A work center is a centralized work group assigned to maintain the technology or network in question. Work centers are often assigned codes in the customer and network business maintenance platform and ticketing systems 108, and the code of the responsible work center is defined in the trouble ticket when the trouble ticket is created. In part B 425 of method 400, rules agents 224 of FIG. 2 determine if rules-based automation is turned on or off for specific work centers. If the work center does not support automated diagnostics, then the process proceeds to step 428. In step 428, a trouble ticket is written for manual diagnostics to troubleshoot the problem.

If the work center does support automated diagnostics, then the process proceeds to decision step 430. In decision step 430, the uniqueness of the trouble ticket is determined. If the trouble ticket is not unique, then the process proceeds to step 432 which terminates this automated diagnose process since a similar ticket exists and is being worked.

If the trouble ticket is unique, then the process proceeds to decision step 434. In decision step 434, a determination is made as to whether the equipment associated with this trouble ticket supports automated diagnostics. If the equipment does not support automated diagnostics, then the process proceeds to step 436 which terminates this automated diagnostic procedure.

If the equipment does support automated diagnostics, then the process proceeds to decision step 438. In decision step 438, it is determined whether test points exist in the circuit layout of the equipment to be tested. If test points do not exist, the test cannot be run and the process proceeds to step 440 which terminates this diagnostic procedure. If the test points do exist, then the process proceeds to connecting point B 442.

Figure 4C:
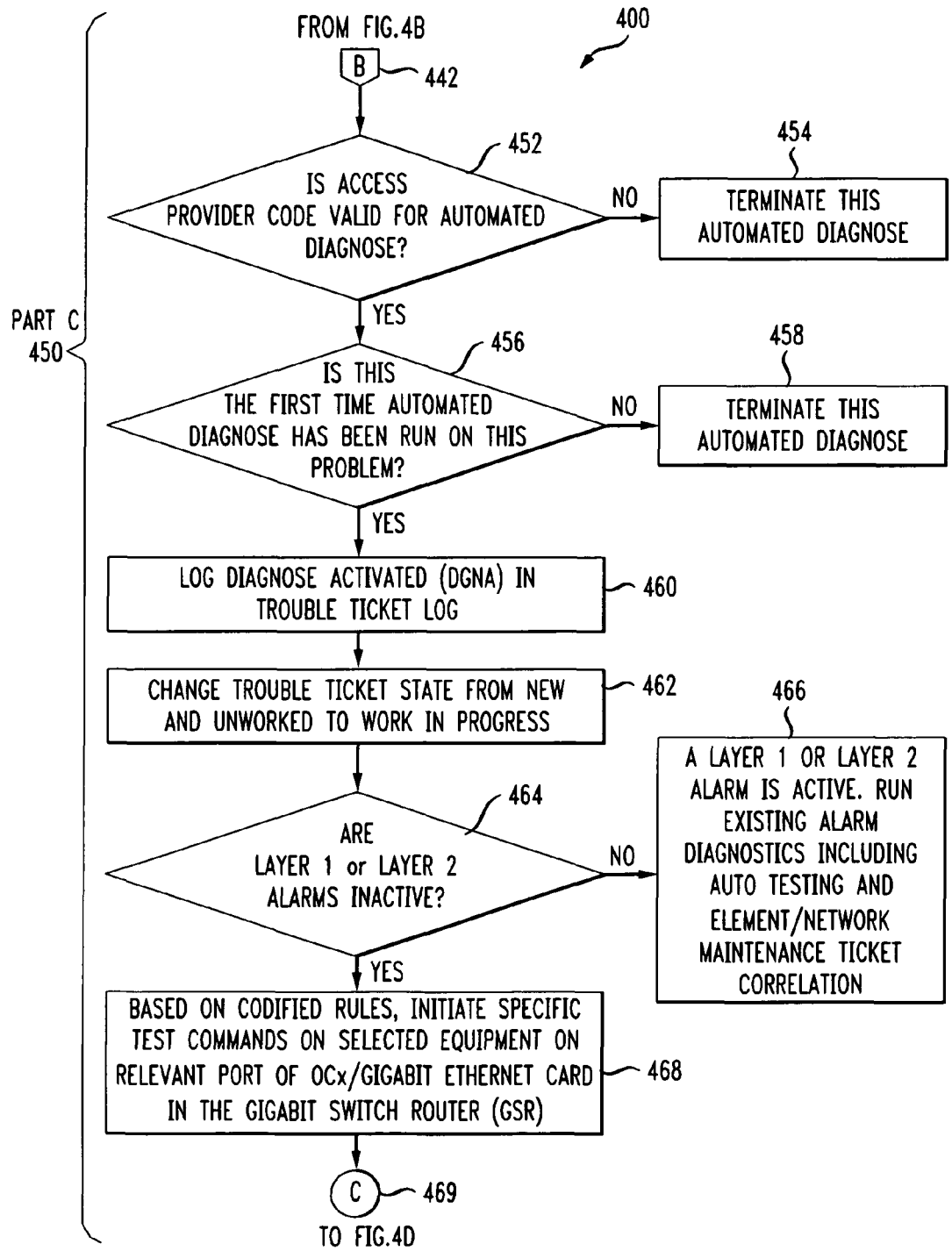
FIG. 4C illustrates a method part C for rules based automated VPN access testing diagnostics in accordance with the present invention.

FIG. 4C illustrates part C 450 of the method 400 for rules based automated VPN access testing diagnostics. Point B 442 connects to decision step 452. In decision step 452, a determination is made as to whether an access provider code is valid for automated diagnostics. If the access provider code is not valid for automated diagnostics, the process proceeds to step 454, which terminates this automated diagnose procedure.

If the access provider code is valid for automated diagnostics, then the process proceeds to decision step 456. In decision step 456, it is determined whether this is the first time the automated diagnose process has been run on this problem. If automated diagnose has been run previously on this problem, then the process proceeds step 458, which terminates this automated diagnose procedure.

If this is the first time an automated diagnose procedure has been run on this problem, then the process proceeds to step 460 which logs diagnose activated (DGNA) in a trouble ticket log. In step 462, the trouble ticket is changed from a new and unworked state to a work in progress state.

The steps beginning with the trouble ticket event 402 of FIG. 4A up to and including step 462 validate the trouble ticket, programs, and equipment required to automatically diagnose the specific problem detected. Beginning in step 464, automated steps to access information and to run diagnostic tests are done in an attempt to isolate the problem and provide directions for problem resolution.

In decision step 464, it is determined whether layer 1 and layer 2 alarms are inactive. If either layer 1 or layer 2 alarms or both alarms are active then the process proceeds to step 466. In step 466, existing alarm diagnostic procedures are run, including auto testing and element/network maintenance ticket correlation. If the layer 1 or layer 2 alarms are inactive, then the process proceeds to step 468. In step 468, specific test commands on the selected equipment are initiated based on codified rules in the RBPA program 316. The specific commands are directed to a port of an optical carrier xx data rate (OCxx) card or gigabit Ethernet card in a gigabit switch router, such as GSR-PE 336. The specific commands are used to evaluate the state of the selected equipment, layer 1 transmission, and layer 2 and layer 3 protocols. Step 468 proceeds to connecting point C 469.

Figure 4D:
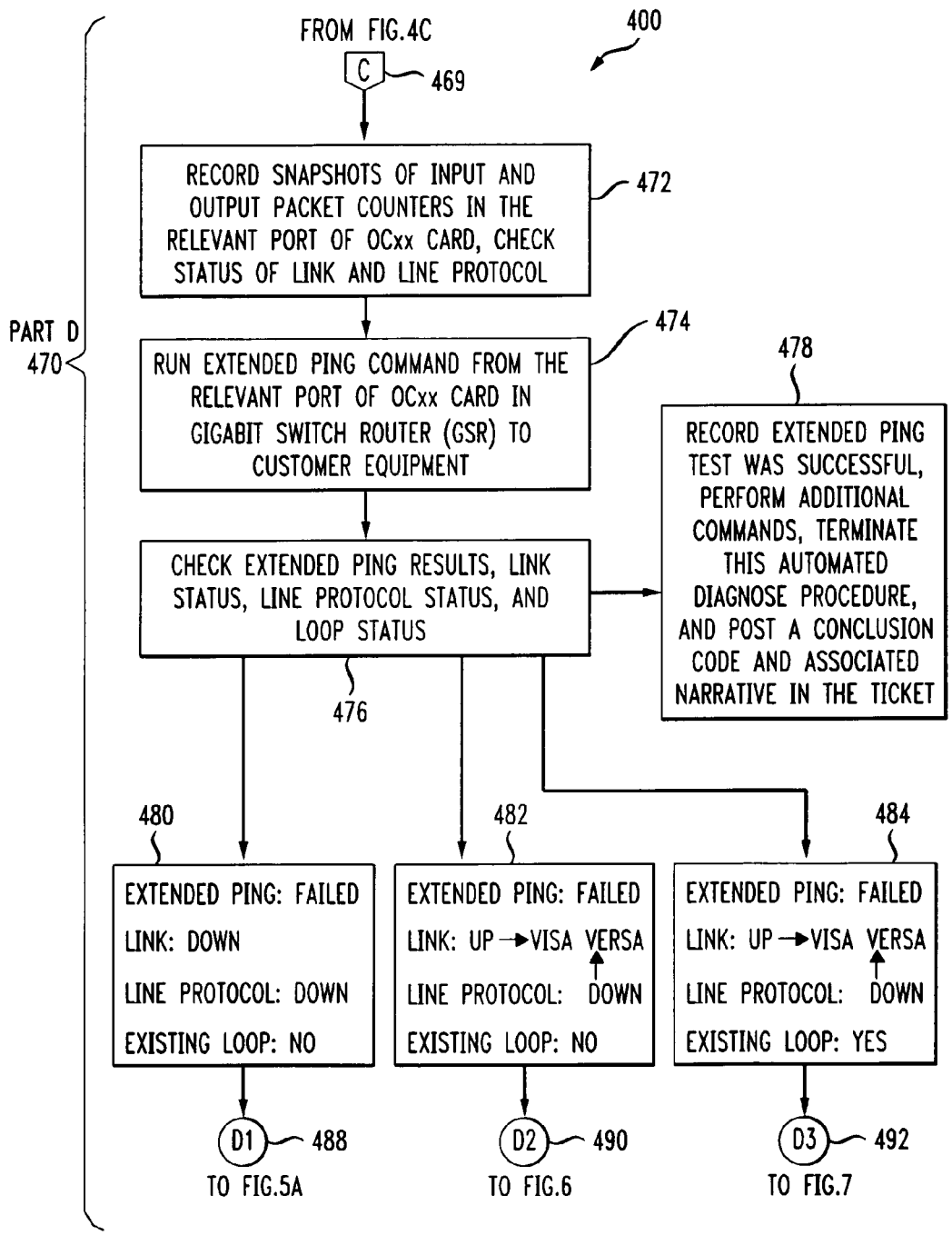
FIG. 4D illustrates a method part D for rules based automated VPN access testing diagnostics in accordance with the present invention.

FIG. 4D illustrates part D 470 of the method 400 for rules based automated VPN access testing diagnostics. Point C 469 connects to step 472. Steps 472 and 474 provide examples of specific test commands of step 468 of FIG. 4C that may be used to evaluate the state of the selected equipment. In step 472, at least two snapshots of input and output (I/O) packet counters, such as I/O packet counters 337, and other characteristics of the relevant port of the OCxx card are recorded. The status of the link and line protocol are also recorded in step 472. The line protocol is associated with the basic transmission over the VPN-provider access network 306 and is concerned with meeting the mechanical, electrical, functional, and procedural specifications for connections between the devices. The link layer component defines the protocol that establishes the connection between the customer device, such as the customer edge router (CER) 320, and the VPN-provider device, such as the gigabit switch router provider equipment (GSR-PE) 336. If there are line protocol problems, then the problem is in the VPN-provider access network 306. If the line protocol is functioning correctly and the link protocol is not, then there is a problem with the equipment at either end of the access network, such as, the CER 320 or the GSR-PE 336.

In step 474, an extended PING command is run from the relevant port of the OCxx card in the gigabit switch router to the customer equipment. The extended PING command routes a message from relevant port of the OCxx card in the gigabit switch router to the customer equipment and back to the initiating point for the message. Additional extended PING tests of selected segments of the VPN access path may also be run. In step 476, an evaluation is made based on the results of the extended PING test, the link status, the line protocol status, and a status of an existing loop indicator where the existing loop is used for loop-back tests.

Of the possible outcomes of the evaluation, four exemplary scenarios are described. A first scenario 478 concerns the situation where the extended PING test was successful and the link status, the line status, and the existing loop status are all positive indicating a non-failing situation at the time of the extended PING test. In the scenario 478, a record is made that the extended PING test was successful, that additional commands were performed to verify the validity of successful operation, that the automated diagnose procedure was terminated, and a conclusion code is posted with an associated narrative and testing results in the ticket associated with the problem as a historical reference.

A second scenario 480 concerns the situation where the extended PING test failed, the link status is down, the line protocol status is down, and the existing loop status is negative. In this scenario, the process proceeds to connecting point D1 488. A third scenario 482 concerns the situation where the extended PING test failed, either the link status is up and the line protocol status is down or vice versa, and the existing loop status is negative. In this scenario, the process proceeds to connecting point D2 490. A fourth scenario 484 concerns the situation where the extended PING test failed, either the link status is up and the line protocol status is down or vice versa, and the existing loop status is positive. In this scenario, the process proceeds to connecting point D3 492.

Figure 5A:
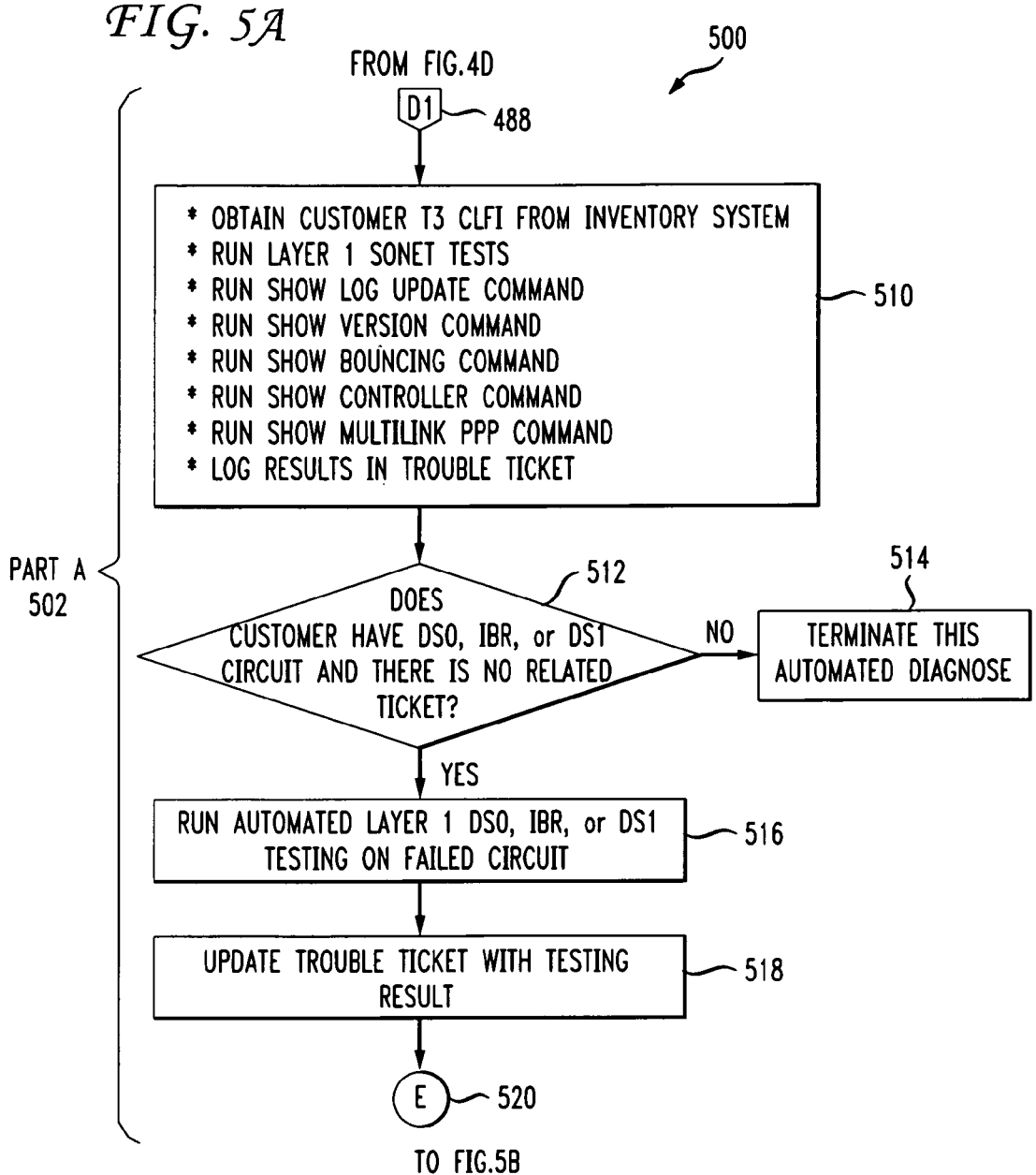
FIG. 5A illustrates a method part A of rules based automated VPN access testing diagnostics for an optical carrier xx data rate (OCxx) card in accordance with the present invention.

FIG. 5A illustrates part A 502 of a method 500 of rules based automated VPN access testing diagnostics for an optical carrier xx data rate (OCxx) card. Point D1 488 connects to step 510. In step 510, numerous commands are run, including obtaining customer T3 common language facility identifier (CLFI) from an inventory system, such as may be found in one of the databases 128 of FIG. 1. Also, Layer 1 SONET tests are run and the results are logged in the trouble ticket. Further commands may include, show log update, show version, show bouncing, show controller, and show multi-link PPP. The results are then recorded in the trouble ticket. The process then proceeds to decision step 512. In decision step 512, it is determined whether the customer has digital signal 0 (DS0), intermediate bit rate (IBR), or digital signal 1 (DS 1) and there is no related ticket. If the customer does not have DS0, IBR, or DS1 or there is a related ticket, then the process proceeds to step 514 which terminates this automated diagnose procedure. If the customer does have DS0, IBR, or DS1 and there is no related ticket, then the process proceeds to step 516. In step 516, automated Layer 1 DS0, IBR, or DS1 testing is done on a failed circuit identified in scenario 480. In step 518, the trouble ticket is updated with the results of testing and then the process proceeds to connecting point E 520.

FIG. 5B illustrates part B 525 of the method 500 of rules based automated VPN access testing diagnostics for an optical carrier xx data rate (OCxx) card. Point E 520 connects to decision step 526. In decision step 526, a determination is made as to whether the trouble reported is a problem associated with a local exchange carrier (LEC), such as LEC 308 of FIG. 3. If the trouble is an LEC problem, the process proceeds to step 528. In step 528, the trouble is referred to LEC diagnose procedures. In step 530, the trouble ticket is changed from work in progress to referral. In step 532, the automated diagnose procedure is terminated and logged as diagnose stopped (DGNS).

Returning to decision step 526, if the trouble is not an LEC problem, the process proceeds to decision step 534. In decision step 534, it is determined whether the trouble reported is a problem associated with a customer premises equipment (CPE), such as CPE 312 of FIG. 3. If the problem is a CPE problem, the process proceeds to step 536. In step 536, an automated voice mail is sent to the customer who is experiencing the problem to inform the customer that the problem resides in his equipment. In step 538, the trouble ticket is changed from work in progress to prepare for ticket clear. In step 540, the automated diagnose procedure is terminated and logged as diagnose stopped (DGNS).

Returning to decision step 534, if the trouble is not a CPE problem, the process proceeds to decision step 542. In decision step 542, it is determined whether the trouble reported is a problem associated with network provider equipment, such as the equipment in the VPN-provider access network 306 of FIG. 3. If the problem is a network provider problem, the process proceeds to step 544. In step 544, the trouble ticket is changed to indicate the network provider problem. In step 546, the trouble ticket state is also changed from work in progress to follow-up. In step 548, the automated diagnose procedure is terminated and logged as diagnose stopped (DGNS).

Returning to decision step 542, if the problem is not a network provider problem then no problem has been found and the process proceeds to step 550. In step 550, the problem is logged as not found and also logged as DGNS.

Figure 6:
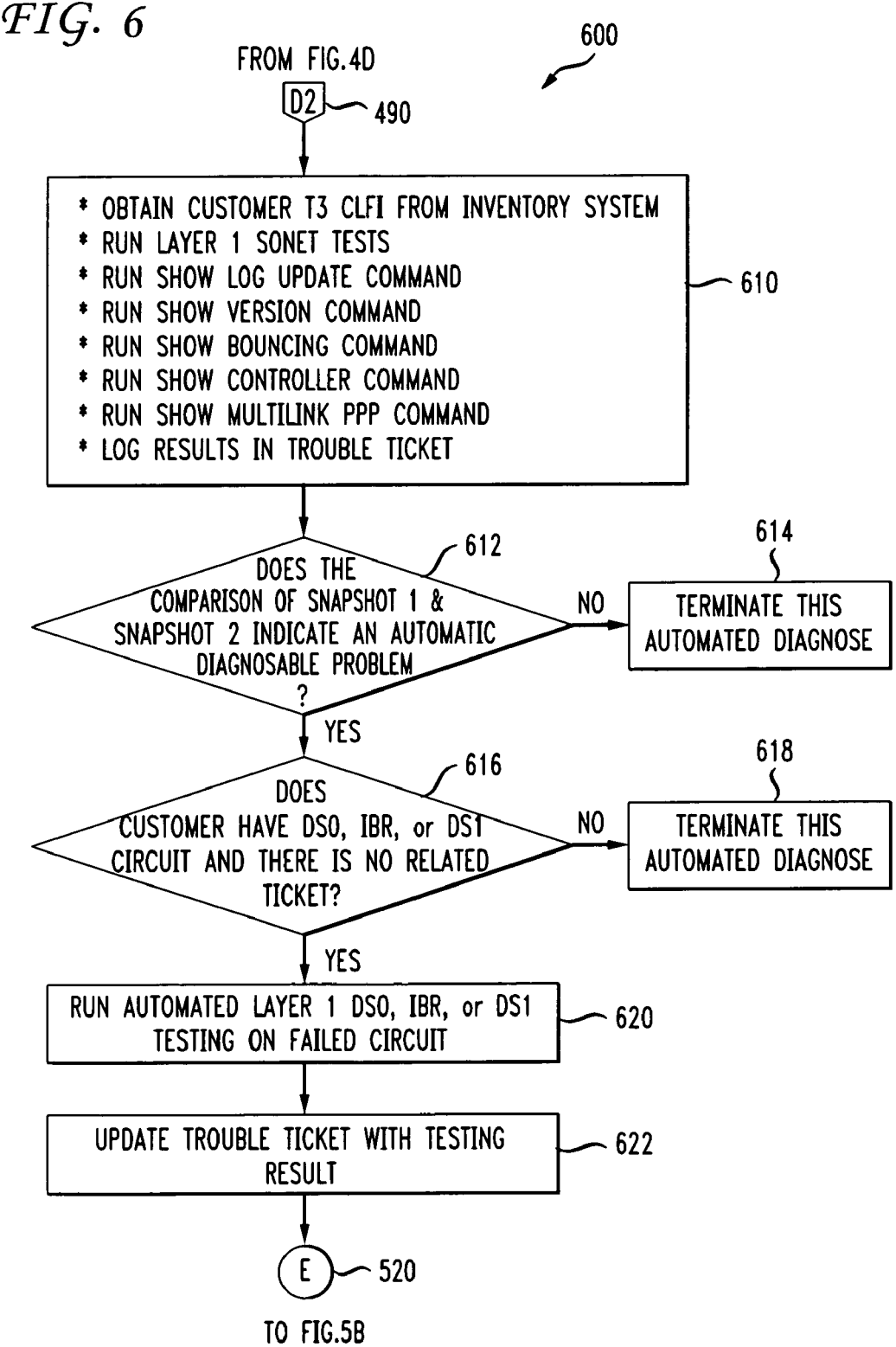
FIG. 6 illustrates a method of rules based automated VPN access testing diagnostics for an optical carrier xx data rate (OCxx) card in accordance with the present invention.

FIG. 6 illustrates a method 600 of rules based automated VPN access testing diagnostics for an optical carrier xx data rate (OCxx) card. Point D2 490 connects to step 610. In step 610, numerous commands are run, including obtaining customer T3 common language facility identifier (CLFI) from an inventory system, such as may be found in one of the databases 128 of FIG. 1. Also, Layer 1 SONET tests are run and the results are logged in the trouble ticket. Further commands may include, show log update, show version, show bouncing, show controller, and show multi-link PPP. The results are then recorded in the trouble ticket. The process then proceeds to decision step 612.

In decision step 612, the at least two recorded snapshots, snapshot 1 and snapshot 2, of the input and output packet counters and other characteristics of the interface in the relevant port of the OCxx card are compared. If it is determined that a problem indicated by the comparison of snapshot 1 and snapshot 2 is not in a category of being automatically diagnosable, then the process is terminated in step 614. If the problem indicated by the comparison of the two snapshots is in the category of being automatically diagnosable, then the process proceeds to decision step 616

In decision step 616, it is determined whether the customer has digital signal 0 (DS0), intermediate bit rate (IBR), or digital signal 1 (DS1) and there is no related ticket. If the customer does not have DS0, IBR, or DS1 or there is a related ticket, then the process proceeds to step 618 which terminates this automated diagnose procedure. If the customer does have DS0, IBR, or DS1 and there is no related ticket, then the process proceeds to step 620. In step 20, automated Layer 1 DS0, IBR, or DS1 testing is done on a failed circuit identified in scenario 482. In step 622, the trouble ticket is updated with the results of testing and then the process proceeds to connecting point E 520 of FIG. 5B.

FIG. 7 illustrates a method 700 of rules based automated VPN access testing diagnostics for an optical carrier xx data rate (OCxx) card. Point D3 492 connects to step 710. In step 710, numerous commands are run, including obtaining a customer T3 common language facility identifier (CLFI) from an inventory system, such as may be found in one of the databases 128 of FIG. 1. Also, Layer 1 SONET tests are run and the results are logged in the trouble ticket. Further commands may include, show log update, show version, show bouncing, show controller, and show multi-link PPP. The results are then recorded in the trouble ticket. The process then proceeds to decision step 712. In decision step 712, it is determined whether a software transmission loop was set up by a technician. If a software transmission loop was set up by a technician, the process terminates the diagnostic procedure in step 714. If a software transmission loop was not set up by a technician, the process proceeds to decision step 716. In decision step 716, it is determined whether the customer has digital signal 0 (DS0), intermediate bit rate (IBR), or digital signal 1 (DS1) and there is no related ticket. If the customer does not have DS0, IBR, or DS1 or there is a related ticket, then the process proceeds to step 718 which terminates this automated diagnose procedure. If the customer does have DS0, IBR, or DS1 and there is no related ticket, then the process proceeds to decision step 720.

In decision step 720, it is determined whether a service code DH was issued. A DH service code indicates a DS1 service was detected. If a service code DH was issued, the process runs DS1 loop detect and clean up command to remove the loop in step 722. The process then proceeds to step 724 in which the trouble ticket state is changed from work in progress to the problem needs further technical analysis. The process then logs diagnose stopped (DGNS) and the automated diagnose procedure is stopped in step 726. Returning to decision step 720. If the service code is not DH, then the problem is related to DS0 or IBR and the process proceeds to step 728. In step 728, automated IBR or DS0 tests are run on the failed circuit detected in scenario 484. In step 730, the trouble ticket is updated with the testing results from step 728 and the process proceeds to step E 520 of FIG. 5B.

While the present invention has been disclosed in a presently preferred context, it will be recognized that the present teachings may be adapted to a variety of contexts consistent with this disclosure and the claims that follow.

For example, the present invention is disclosed mainly in the context of diagnosing failures of systems employing an optical carrier xx (OCxx) card. It will appreciated that it may also be employed with gigabit Ethernet cards and the like. It will also be appreciated that variations in the particular hardware and control process employed are feasible, and to be expected as both evolve with time. For example, codified rules may be enhanced and additional testing may be devised to improve the gathering of information associated with a failure event. Other variations may include different alternatives to extended PING testing to echo back a message from an originating source to a destination address and return back to the originating source to determine status of equipment on the message path. Other such modifications and adaptations to suit a particular design application will be apparent to those of ordinary skill in the art.

We claim:

1. A method based on codified rules for automatically isolating failures in segments of a virtual private network (VPN) access path comprising:
   receiving an indication of a failure in a rules based process automation (RBPA) program that is separate from the VPN access path;
   determining, based on codified rules associated with the RBPA program, equipment associated with the failure including customer premises equipment (CPE), local exchange carrier equipment, and network provider equipment including VPN core access point equipment to a VPN core that are used on segments of the VPN access path;
   gathering information related to the determined equipment used on the segments of the VPN access path, including support of automated diagnostic procedures and communication protocols used;
   running a loop-back test on a selected segment of the VPN access path initiated by a request of the RBPA program to a centralized test platform which connects to the VPN access path;
   determining status including results of the loop-back test, a link status, a line protocol status, and an existing loop status;
   running additional selected tests based on the codified rules and the status; and
   isolating the failure to the local exchange carrier equipment, the CPE, or the network provider equipment.

2. The method of claim 1 wherein the loop-back test is an extended PING test.

3. The method of claim 2 wherein the status is the extended PING test failed, the link status is down, the line protocol status is down, and the existing loop status is positive.

4. The method of claim 2 wherein the status is the extended PING test failed, the link status is up, the line protocol status is down, and the existing loop status is negative.

5. The method of claim 2 wherein the status is the extended PING test failed, the link status is down, the line protocol status is up, and the existing loop status is negative.

6. The method of claim 2 wherein the status is the extended PING test failed, the link status is up, the line protocol status is down, and the existing loop status is positive.

7. The method of claim 2 wherein the status is the extended PING test failed, the link status is down, the line protocol status is up, and the existing loop status is positive.

8. The method of claim 1 wherein the information on the determined equipment is obtained from a customer and network inventory databases, the information including devices that support loop-back testing.

9. The method of claim 8 wherein the additional tests include loop-back testing of other selected segments of the VPN access path.

10. A computer system for automatically isolating failures in segments of a virtual private network (VPN) access path using an automatic diagnostic program comprising:
    means for receiving an indication of a failure in a rules based process automation (RBPA) program that is separate from the VPN access path;
    a memory containing codified rules and the RBPA program for running automatic diagnostic procedures associated with the failure;
    means for determining, based on the codified rules, equipment associated with the failure including customer premises equipment (CPE), local exchange carrier equipment, and network provider equipment including VPN core access point equipment to a VPN core that are used on segments of the VPN access path;
    means for gathering information related to the determined equipment used on the segments of the VPN access path, including support of automated diagnostic procedures and communication protocols used;
    means for running an extended PING test on a selected segment of the VPN access path initiated by a request of the RBPA program to a centralized test platform which connects to the VPN access path;
    means for determining status including results of the extended PING test, link status, line protocol status, and existing loop status;
    means for automatically running by the rules based program additional selected tests based on the codified rules and the status; and
    means for isolating the failure to the local exchange carrier equipment, the CPE, or the network provider equipment.

11. The computer system of claim 10 wherein the VPN core access point equipment is an optical carrier xx (OCxx) card in a gigabit switch router.

12. The computer system of claim 11 wherein the status is further determined by reading and comparing snapshots of input and output packet counters in a port of the OCxx card.

13. The computer system of claim 10 wherein the additional tests include testing of the communication protocols used, including support for digital signal 0 (DS0), intermediate bit rate (IBR), digital signal 1 (DS1), and layer 1 synchronous optical network (SONET) tests.

14. The computer system of claim 10 further comprises:
    means for automatically sending a voice message to a person responsible for the customer premises equipment (CPE) when the failure is isolated to the CPE.

15. A non-transitory computer-readable medium whose contents cause a computer system to perform an automated rules-based analysis of reported failures in segments of a virtual private network (VPN) access path comprising:
  determining a reported failure meets the requirements for automatic diagnostic procedures according to a rules based process automation (RBPA) program that is separate from the VPN access path;
  determining, based on codified rules associated with the RBPA program equipment associated with the failure including customer premises equipment (CPE), local exchange carrier equipment, and network provider equipment including VPN core access point equipment to a VPN core that are used on segments of the VPN access path;
  gathering information related to the determined equipment used on the segments of the VPN access path, including support of automated diagnostic procedures and communication protocols used;
  running an extended PING test on a selected segment of the VPN access path initiated by a request of the RBPA program to a centralized test platform which connects to the VPN access path
  determining status including results of the extended PING test, link status, line protocol status, and existing loop status;
  running additional selected tests based on codified rules and the status; and
  isolating the failure to the local exchange carrier equipment, the CPE, or the network provider equipment.

16. The non-transitory computer-readable medium of claim 15 further comprises:
  applying the codified rules by rule agents to determine the additional selected tests based on an analysis of the results of the extended PING test, link status, line protocol status, and existing loop status.

17. The non-transitory computer-readable medium of claim 16 wherein the gathering of information is directed by the rule agents.

18. The non-transitory computer-readable medium of claim 15 wherein the information on the determined equipment is obtained from a customer and network inventory databases, the information including equipment that support loop-back testing.

19. The non-transitory computer-readable medium of claim 18 wherein the additional tests are automatically selected by rule agents operating in the RBPA program and include loop-back tests of equipment that supports loop-back testing.

20. The non-transitory computer-readable medium of claim 19 further comprises:
  running the loop-back tests in a selected sequence to isolate the failure to a specific segment of the VPN access path.

* * * * *